United States Patent [19]

Wada et al.

[11] 4,326,580
[45] Apr. 27, 1982

[54] METHOD OF FABRICATING A STRUCTURAL MEMBER BY ELECTRO SLAG FORMING

[75] Inventors: Takeshi Wada; Tetsuo Okuni, both of Hitachi, Japan

[73] Assignee: Hitachi, Ltd., Tokyo, Japan

[21] Appl. No.: 85,301

[22] Filed: Oct. 16, 1979

[30] Foreign Application Priority Data

Oct. 16, 1978 [JP] Japan .................................. 53/126229
Feb. 2, 1979 [JP] Japan .................................. 54/10444

[51] Int. Cl.³ ............................................ B22D 27/02
[52] U.S. Cl. .................................... 164/497; 164/515; 164/76.1
[58] Field of Search ...................... 164/52, 252, 98, 99, 164/100–103; 75/10 C; 13/9 ES, 18 A, 18 B; 219/10.81, 69 E; 415/200, 214; 416/241 R

[56] References Cited

U.S. PATENT DOCUMENTS

| | | | |
|---|---|---|---|
| 3,649,733 | 3/1972 | Schlinger | 164/52 X |
| 3,715,201 | 2/1973 | Schlatter | 164/252 X |
| 3,801,226 | 4/1974 | Bevan et al. | 415/200 X |
| 3,801,353 | 4/1974 | Brill-Edwards | 416/241 X |
| 3,892,271 | 7/1975 | Medovar et al. | 164/252 |
| 3,902,823 | 9/1975 | Minato et al. | 416/241 X |
| 4,008,052 | 2/1977 | Vishnevsky et al. | 164/100 X |

FOREIGN PATENT DOCUMENTS

| | | |
|---|---|---|
| 2109882 | 12/1974 | Fed. Rep. of Germany . |
| 2403843 | 4/1975 | Fed. Rep. of Germany ........ 164/52 |
| 52-9103 | 1/1977 | Japan .................................. 415/200 |
| 52-57019 | 5/1977 | Japan .................................. 164/252 |
| 53-89824 | 8/1978 | Japan . |
| 54-10532 | 5/1979 | Japan .................................. 164/52 |
| 1230197 | 4/1971 | United Kingdom .................. 164/52 |

OTHER PUBLICATIONS

"Electroslag Furnaces" by Paton, Kiew, Naukova Dumka, 1976, pp. 309–310 and pp. 306–307.

Primary Examiner—Robert D. Baldwin
Assistant Examiner—K. Y. Lin
Attorney, Agent, or Firm—Thomas E. Beall, Jr.

[57] ABSTRACT

A method of fabricating a structural member such as a wicket gate for water turbines by electro slag forming comprises the steps of mounting a water-cooled metal mold on a part of a previously formed structural member, such as a stem; melting electrodes inserted in the water-cooled metal mold to form the other part of the structural member such as a vane portion of the wicket gate on the previously formed structural member. The previously formed structural member has a concave portion which is exposed in the water-cooled metal mold and the water-cooled metal mold is mounted so as to contact with the previously formed structural member at the lower portion than the top of the concave portion. The previously formed structural member is melted gradually from the central portion of the concave to the outer periphery and then such a portion as the vane portion is formed by molten metal of the electrode.

6 Claims, 5 Drawing Figures

METHOD OF FABRICATING A STRUCTURAL MEMBER BY ELECTRO SLAG FORMING

BACKGROUND OF THE INVENTION

This invention relates to a method of fabricating a structural member by electro slag forming, and more particularly to a method of fabricating a unitary structural member, in which a part of the unitary structual member is formed, on the other part thereof which is previously made in a certain shape, by electro slag forming.

In a structural member such as a wicket gate for a water turbine, different materials are often required in its different portions. The wicket gate comprises a vane portion, two journal portions on the both sides of the vane portion, and a stem portion extending from one of the journal portions. The vane portion is disposed in a water flow, with the both journal portions being rotatably supported by bearings, and moved by the stem portion which is mechanically connected to a driving apparatus so as to be opened and closed. The vane and journal portions are in contact with a water flow, and the journal portions each are subjected to friction caused by the bearing. Therefore, the vane and journal portions have been made of corrosion-resisting and wear-proof material. The stem portion also is made of the same material as the vane. For the stem portion, such a material is not necessary because it is enough as long as force from the driving apparatus is transmitted to the vane portion. Thus, in the wicket gate, different materials are required in different portions.

A conventional wicket gate, however, is made unitarily of the same material by casting. According to the casting, in order to form a more reliable wicket gate, the whole wicket gate must be made of a more reliable material, which is very expensive.

Further, the casting necessitates a plurality of processes for forming the wicket gate, including manufacture of wooden and sand patterns, casting, sand removing, etc. Additionally, the cast wicket gate has defects such that blow holes are easily made in the cast wicket gate.

Thus, it is desired that high quality of the wicket gate is made more economically.

SUMMARY OF THE INVENTION

An object of the invention is to provide a method of fabricating a structural member, in which a part of the structual member is formed, by electro slag forming, on the other parts or part which is previously formed.

Another object of the invention is to provide a method of fabricating a wicket gate for a water turbine which has at least a portion higher in quality than the other portion, which portion is formed by electro slag forming.

Further another object of the invention is to provide a method of fabricating a wicket gate of high quality for a water turbine by employing electro slag forming and raising material quality of only a portion of the wicket gate which is necessary to raise the material quality.

Briefly stated, a feature of the invention is that a structural member such as wicket gate for a water turbine is made by forming, by electro slag forming, a portion of the structural member necessary to be higher in material quality on the other portion of the structural member.

DESCRIPTION OF THE PREFERRED EMBODIMENT

First, a wicket gate for a water turbine as an example of a structural member fabricated by a method of fabricating a structural member by electro slag forming according to the invention will be explained, referring to FIG. 1.

Figure 1:
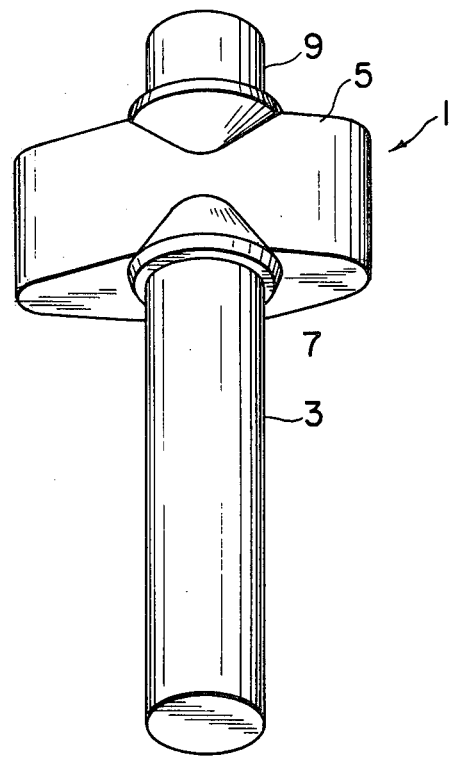
FIG. 1 is a perspective view of a wicket gate (guide vane) for a water turbine.

In FIG. 1, a wicket gate 1 comprises a stem portion 3, a vane portion 5 provided on one end of the stem portion 3, and journal portions 7, 9 on the both sides of the vane portion 5. The wicket gate 1 is rotatably supported by bearings not shown at the journal portions 7 and 9 when assembled in a water turbine not shown. The stem portion 3 is mechanically connected to a driving apparatus such as a hydraulic apparatus not shown and moves the vane portion 5 disposed in water flow to open and shut. The vane portion 5 and the journal portions 7, 9 are preferable to be of higher quality material than the stem portion 3.

Figure 4:
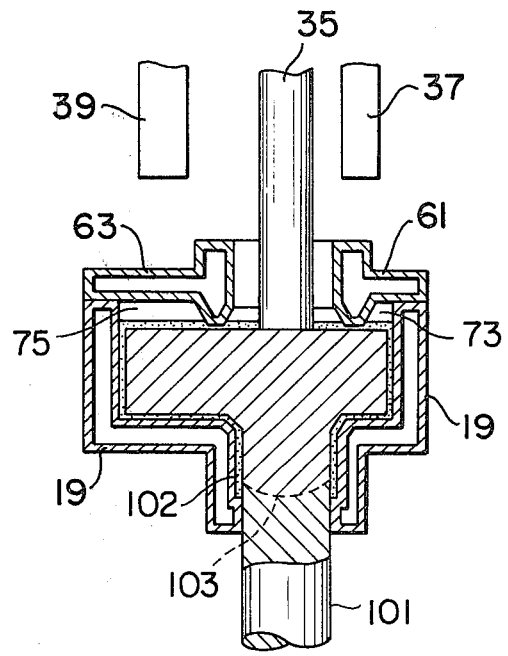
FIG. 4 is a sectional view of a part of the electro slag forming apparatus and the wicket gate being formed.
Figure 5:
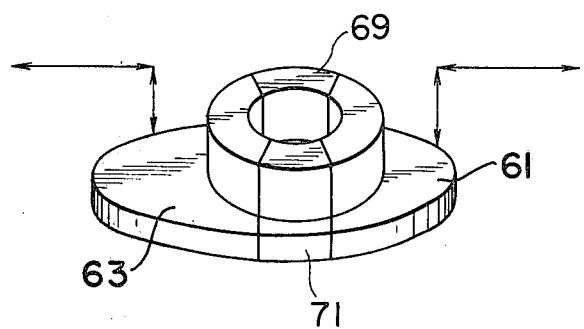
FIG. 5 is a perspective view of a cupper mold assembly.

Next, an embodiment of a method of fabricating a wicket gate comprising different materials by electro slag forming according to the invention will be described hereinafter in detail, referring to FIGS. 3 to 5.

Figure 3:
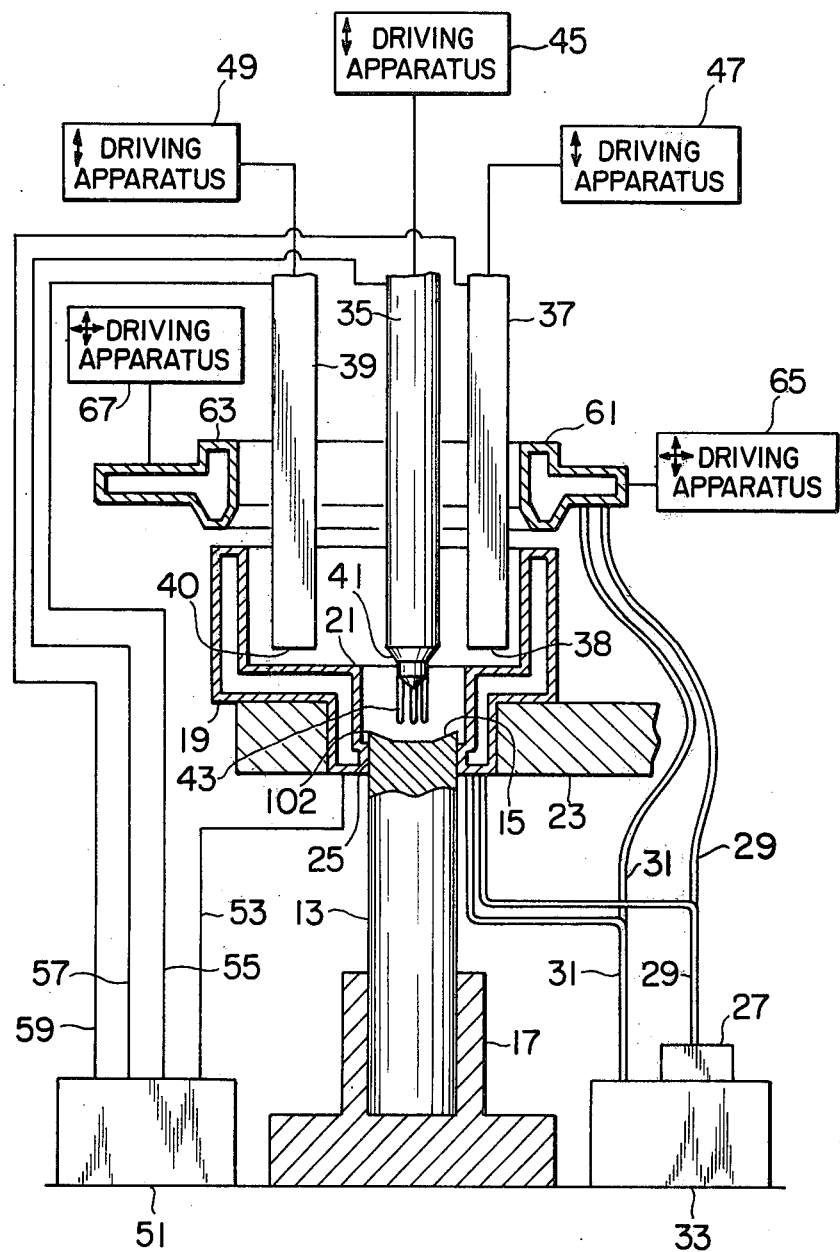
FIG. 3 is a sectional view of apparatus for electro slag forming, in which a workpiece is set for manufacturing a wicket gate.

In FIG. 3, a cylindrical member 13 of mild steel (hereinafter referred to as simply the stem 13) is shaped in an inverted frustum of cone by machining at one end 15. For the concave shape of the end 15, it is preferable to be the shape of solidification interface produced by solidification of molten metal, but in this embodiment the inverted frustum of cone near to the shape of the solidification interface is employed since the formation of it is easy. The stem 13 is vertically disposed in a rest 17 so that the concave end 15 will be positioned on top. A lower water-cooled cupper mold 19, which is for molding the journal portion 7 and the vane portion 5 in FIG. 1 and which has the inner face 21 made a little larger in size than the journal and vane portions 7 and 5 by the thickness of molten slag adhered to the inner wall plus shrinkage of molten alloy, is disposed around and adjacent the upper portion of the stem 13 and fixed to a stationary member 23. The lower portion 25 of the lower cupper mold 19 which is to form the journal portion 7, as a reduced diameter portion that is disposed a little lower than the top of the stem 13 and contacts with the outer face of the stem 13 so that an annular gap 102 is defined by the top of the stem 13 and the lower cupper mold 19 above the reduced diameter portion. The lower cupper mold 19 is cooled by water being circulated by a pump 27 through a pipe 29, the lower cupper mold 19, a pipe 31, and a water tank 33. In a space or cavity defined by the lower cupper mold 19 and the concave end face 15 of the stem 13, three consumable electrodes 35, 37, 39 made of the same material as the vane and journal portions 5, 7, such as 18-8 stainless steel of corrosion-resistance and wear-resistance material, are disposed. The electrode 35 which is cylindrical and solid faces the concave end 15 of the stem 13 at the lower end 41. The lower end 41 of the central electrode 35 is tapering and provided with a plurality of wires 43, each made of the same material as the electrodes 35, 37, 39. The electrodes 35, 37, 39 are mechanically connected to driving apparatus such as manipulators 45, 47, 49, respectively, and moved upward and downward. The electrodes 35, 37, 39 and the lower cupper mold 19 each are electrically connected to an electric control apparatus 51 through electric wires 53, 55, 57, 59. The electric control apparatus 51 controls voltage and electric current applied in the electrodes 35, 37, 39. Over the lower cupper mold 19, upper water-cooled cupper molds 61, 63 mechanically connected to driving apparatus 65, 67, such as manipulators, respectively are disposed. The upper cupper molds 61, 63 each are moved horizontally and vertically by the manipulators 65, 67. The other upper cupper molds 69, 71 are fixedly set so as to guide molten metal in cooperation with the upper movable cupper molds 61 and 63 as shown in FIGS. 4 and 5. The upper cupper molds 61, 63, 69, 71 each are cooled by water being circulated by the pump 27 through pipes 29 and 31.

Under the above-mentioned condition, flux is supplied into the space or cavity of the lower cupper mold 19, to the extent that the wires 43 arranged on the end 41 of the central electrode 35 are immersed in the flux. The electrode 35 is positioned so as to keep a certain distance between the wire ends and the concave end 15 of the stem 13. The other electrodes 37, 39 also, are positioned so as to keep a distance between the ends of the electrodes 37, 39 and the lower cupper mold 19. In such a condition, voltage is applied between the electrodes 35, 37, 39 and the lower cupper mold 19. Arcs take place between the wires 43 of the electrode 35 and the concave face 15 of the stem 13, and the arcs are immersed in the flux. By the heat of the arcs, the flux melts so that the arcs disappear. As a result, the electrode 35 is melted by electric resistance heat which is produced in the molten slag. As the electrode 35 melts, it is lowered by the manipulator 45. The molten alloy of the electrode 35 is filled in the cavity to raise the liquid level while the filled alloy is being partially solidified from the concave end face 15 by the cooling action of water. When the liquid level of molten alloy of the electrode 35 reaches the lower ends 38, 40 of the electrodes 37 and 39, they start to melt. Melting rate increases by gradually lowering the electrodes 37 and 39 being melted. When the liquid level of molten alloy reaches to a predetermined level, that is, the amount of the alloy enough to form the vane portion 5 is melted, the side electrodes 37 and 39 are raised over the liquid level at a rapid speed as shown in FIG. 4. Immediately after the elevation of the electrodes 37 and 39, the upper cupper molds 61 and 63 are positioned as shown in FIG. 4, accompanying a horizontal movement and then a vertical movement. As the central electrode 35 continues to melt, molten alloy thereof is filled in the cavity for the journal portion 9.

Under the upper cupper molds 61, 63, molten slag chamber 73, 75 are formed between the upper cupper molds 61, 63, 69, 71, and molten alloy. The chambers 73, 75 hold molten slag therein, whereby depth of the molten slag in the cavity for forming the journal portion 9 is kept proper so that the central electrode 35 can continue to melt without fluctuation of melting.

Figure 2:
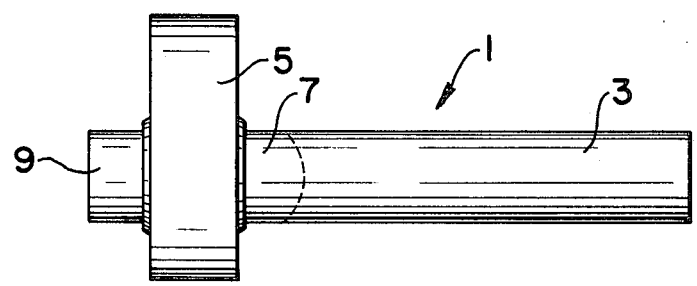
FIG. 2 is a front view of the wicket gate.

After the cavity defined by cupper molds 19, 61, 63, 69, 71 is filled with molten alloy and solidified, the cupper molds 19, 61, 63, 69, 71 are removed from an electro slag formed wicket gate 101. The wicket gate 101 is subjected to machining the outer faces of the journal portions 7, 9 and the vane portion 5 so that the wicket gate 1 shown in FIGS. 1, 2 is completed. The materials are approximately divided by about a solidification interface 103, the shape of which is approximately semispherical.

In this embodiment, the stem 13 has the concave end face 15 shaped at the top, whereby first, the stem 13 is melted at the central portion and then the molten portion goes toward the outer surface which is relatively difficult to rise in temperature. The outer surface of the stem 13 at the top is heated sufficiently, and then starts to melt. Further, between the outer face of the top portion of the stem 13 adjacent end 15 and lower cupper mold 19 there is defined a gap 102. Therefore, the outer face at the top is prevented from being overcooled by the cupper mold, whereby the whole concave end portion is sufficiently melted so that a preferable and stable joining can be achieved. Therefore insufficient melting portions can be prevented.

Further the slag chambers 73, 75 prevent that a slag pool used for forming the journal portion 9 becomes too deep, so that the electrode 35 can be melted stably.

Still further, the plurality of fine wires 43 provided on the lower end 41 of the electrode 35 cause easily arcs from the electrode 35 and enable to easily control electric current supplied for melting the electrode so as to reduce the fluctuation of the current.

In this embodiment, the materials used for the stem and the electrodes are of different kinds of chemical components. Even if the stem 13 and the electrodes 35, 37, 39 each comprising the same kind of chemical components are used for fabricating the wicket gate 1, the portion formed by electro slag forming becomes different in material from the other portions because the electro slag forming accompanies refining action of the material used for the electrodes so that the portion formed by the electro slag forming can become higher in material quality. In particular, phosphate and sulpher contained in the material for the electrodes 35, 37, 39 are reduced in amount.

In the electro slag forming, melting and solidification occur at the same time and gradually, so that any gas can not be brought into the fabricated body. Therefore, a high quality wicket gate can be fabricated.

Thus, according to the present invention, a stable and unitary structural member can be easily fabricated by forming, by electro slag forming, a portion thereof on a previously formed member.

What is claimed is:

1. A method for fabricating a structural member by electro slag forming, which method comprises the steps of:

preparing a previously formed structural part for forming a first part of the structural member to be fabricated;

disposing vertically the previously formed structural first part;

mounting fluid-cooled metal mold means on the previously formed structural first part so that the upper end of the previously formed structural first part and the fluid-cooled metal mold means will define a cavity for forming a second part of the structural member to be fabricated;

supplying flux into the cavity;

arranging at least an electrode provided with a plurality of fine wires in the cavity so that the ends of the plurality of fine wires will face the upper end of the previously formed structural first piece;

applying electric voltage between the electrode and the fluid-cooled metal mold means so that initially arcs occur between the plurality of fine wires and the previously formed structural first piece to melt the fine wires, and then the flux and the electrode are melted in turn;

removing the electrode from the cavity filled with a sufficient amount of molten metal to form said part of the structural member to be fabricated; and removing the fluid-cooled metal mold means from the structural member fabricated after solidification of the molten metal.

2. A method of fabricating a wicket gate for a water turbine having stem, vane and two journal portions, by electro slag forming, which method comprises the steps:

preparing a stem used for the stem portion of the wicket gate;

fixing vertically the stem to a stationary member;

mounting water-cooled metal mold means on the stem so that a cavity for forming the journal portions and vane of the wicket gate will be defined by the water-cooled metal mold means and the upper end of the stem;

supplying flux into the cavity;

arranging at least a first electrode with a plurality of fine wires of a metal suitable for fabricating the vane and journal portions of the wicket gate into the cavity so that the ends of the plurality of fine wires will face the upper end of the stem;

applying electric voltage between the stem and the first electrode so that initially, arcs occur between the plurality of fine wires and the upper face of the stem to melt the plurality of fine wires, and then the flux and the first electrode are melted in turn;

moving vertically the first electrode according to vertical movement of molten metal;

removing the first electrode from the cavity after molten metal of the first electrode is filled in the cavity sufficiently to form the vane and journal portions; and removing the water-cooled metal mold means from the wicket gate fabricated.

3. The method as defined in claim 2, further including the step of providing an annular split upper mold partially closing the upper end of said cavity to form the vane between the upper mold and the mold means, to form an upper journal portion chamber to be filled with molten metal, to form a closed slag chamber above the vane chamber radially outward from said upper journal portion chamber, and form a partition wall engaging the molten metal forming the vane between and completely separating said slag chamber and said upper journal portion chamber; further including the step of water-cooling said upper mold; and wherein said step of applying provides the liquid level of the molten metal so that it reaches a level enough to fill the vane chamber and form the vane portion, the slag that was generally radially outward from the upper journal portion chamber during filling of the vane chamber moves upwardly to said slag chamber so as to be separated from the upper journal portion chamber so that the molten slag on the molten metal above the vane is held in the slag chamber and the depth of the slag in the upper journal portion chamber is kept proper.

4. The method as defined in claim 3, further including the step of:

arranging a second electrode in the cavity for forming the vane portion and applying electric voltage to it so that said second electrode is melted in the cavity;

rapidly removing the second electrode from the cavity when the molten metal reaches a level enough to form the vane in the cavity; and after the removing of the second electrode, rapidly mounting the split upper parts of the water-cooled upper mold that in part form said slag chamber, for guiding the molten metal so as to form the journal portion.

5. The method as defined in claim 2, further including the step of forming the upper end of the stem into an inverted frustum of a cone.

6. The method as defined in claim 3, wherein said steps are conducted so that the stem is different in chemical composition from the electrode and the fine wires.

* * * * *